No. 650,518. Patented May 29, 1900.
C. SAVIGNY.
PROCESS OF MAKING DIOXID OF BARIUM.
(Application filed Dec. 10, 1898.)
(No Model.)
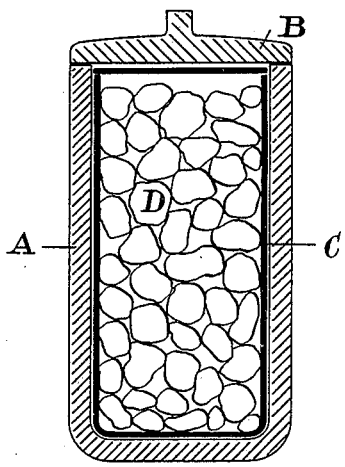
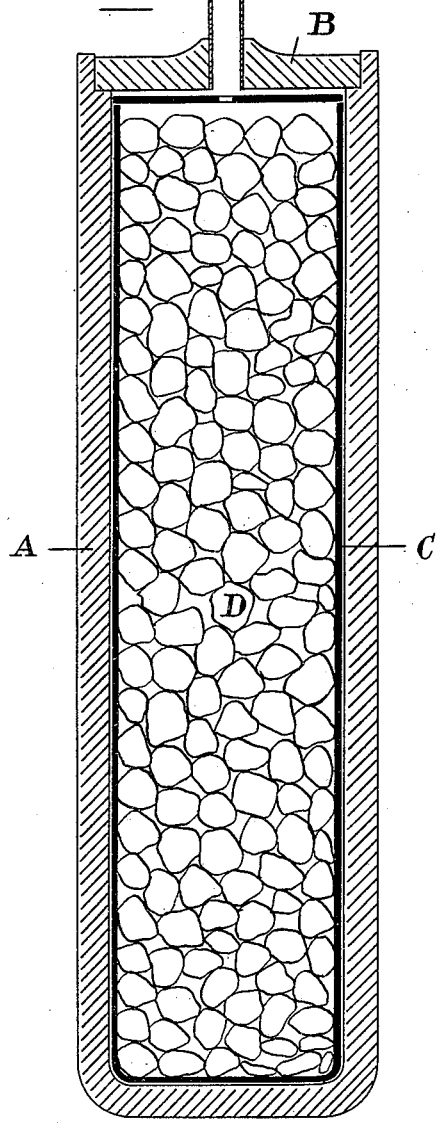
Witnesses
Clément Martin
Jean Germain
Inventor
Claude Savigny

UNITED STATES PATENT OFFICE.

CLAUDE SAVIGNY, OF LYONS, FRANCE.

PROCESS OF MAKING DIOXID OF BARIUM.

SPECIFICATION forming part of Letters Patent No. 650,518, dated May 29, 1900.

Application filed December 10, 1898. Serial No. 698,903. (No specimens.)

*To all whom it may concern:*

Be it known that I, CLAUDE SAVIGNY, dyer, a citizen of the Republic of France, residing at 15 Route de Vaulx, Lyons, in the Republic of France, have invented certain new and useful Improvements in the Manufacture of Dioxid of Barium, of which the following is a specification.

In order to manufacture dioxide of barium ($BaO_2$) under favorable industrial conditions, it is necessary to pass a current of air or of oxygen over anhydrous baryta ($BaO$) which is as porous and as pure as possible and at a dull-red heat. If the baryta is not porous, or if it is compact or is not pure, a poor and impure dioxide of barium is obtained, and one which is not suitable for the uses for which such product is intended. Hitherto in order to obtain this porous anhydrous baryta adapted for yielding a rich dioxide of barium (eighty-two to ninety per cent. of purity) nitrate of baryta has been taken as the primary substance. By calcination of this nitrate a porous and relatively-pure anhydrous baryta is obtained, upon which a current of air is caused to pass at a dull-red heat.

Numerous attempts have been made to obtain an anhydrous baryta, pure and porous, without employing nitrate of baryta, because the element nitre is relatively costly and is completely lost in the cycle of operations. Thus attempts have been made to dioxidize an anhydrous baryta obtained by the calcination of carbonate of baryta; but this being dense and but very slightly porous gives a poor dioxide of barium, (about sixty per cent.) This process has therefore not been commercially successful.

According to my invention I employ as primary barytic substance hydrated crystallized baryta in order to obtain an anhydrous, porous, and pure baryta.

Now the essential, novel, and characteristic feature of my invention consists in the application of the reducing energy acquired by carbon in a finely-divided condition when its action upon hydrate of baryta takes place at a suitable temperature.

I will not describe any process for the manufacture of hydrated baryta. The essential point is to employ a product which is as pure as possible.

The greater part of the water in the hydrated baryta may be expelled at a relatively-low temperature; but with regard to the remaining water, that which is termed "water of composition," it has not hitherto been possible to eliminate the same by a commercially-practicable process giving a porous anhydrous oxide of barium capable of becoming dioxidized at a high standard of purity.

The operation of reducing the magma to anhydrous oxide of barium may take place in ovens, muffles, or retorts; but I have obtained the best results by operating within a crucible of plumbago or other refractory substance, provided with a lid and lined internally with a wall or layer of specially-prepared agglomerated organic substance. This lining assumes the form of the crucible as the calcination of the carbon, which forms its "framework," so to speak, proceeds and resists equally with the crucible itself the high temperature employed. The crucible in these conditions, with its double wall, regulates the operation and prevents any injurious oxidizing action in such a manner that the hydrate of baryta is transformed rapidly and integrally into anhydrous oxide of barium which is of great purity and extremely porous, owing to which it is readily dioxidable. This combination of circumstances enables the action of carbon upon hydrated baryta to be carried out industrially without corrosion of the crucibles or loss of material, which constitutes an important feature.

The dehydration of baryta by means of carbon is a novel and characteristic feature. It is well known that the "water of position" of hydrate of baryta could not hitherto be eliminated by means of an industrially-practicable process with the production of a pure, porous, and anhydrous baryta.

In the accompanying drawings, Figure 1 shows a crucible which, for example, may be employed for operating; and Fig. 2 shows a retort for use in manufacturing on a large scale.

A is the crucible or retort; B, the cover or lid of the same; C, the internal lining of paper, cardboard, or the like, forming an inner coating of the crucible or retort, and D is the magma.

The two receptacles shown in Figs. 1 and 2 have the same form as that shown in Fig. 1, having a cover so formed that the gas evolved can easily escape through the interstices between the said cover and the crucible, while in Fig. 2 it is advantageous to provide the cover of the retort with a small tube for the escape of the gas. In order to carry out this operation practically I proceed in the following manner: I take hydrated baryta, either crystallized or not, but as pure as possible. I mix this intimately with a chemical equivalent of carbon, (about six kilograms of pure carbon for one hundred and fifty-seven kilograms of pure crystallized baryta.) Carbon of any kind may be employed, provided it be as pure as possible, such as coal, lampblack, coke-dust, vegetable charcoal, or, in short, any substance capable of giving carbon by calcination. It should be added that care should be taken to employ these carboniferous substances in an infinitely-divided condition if they are solid. This having been done, I heat this mixture in basins of sheet, cast, or enameled cast metal for two or three hours at a temperature of 100° to 150° centigrade, thereby producing fusion of the mass and ebullition, finally giving a solid blackish mass more or less completely dried. The greater portion of the water is thus removed. I then prepare a crucible of plumbago, refractory earth, or other substance in the following manner: I arrange at the bottom of this crucible and over the whole of its internal walls a sheet of cardboard, which forms an internal lining of the crucible. The magma obtained in the manner above described is placed therein, and a piece of cardboard is then placed upon this magma, a cover being finally placed upon the crucible which will allow the gases produced to escape. The crucible is then introduced into an oven and heated to a bright red (about 1,000° to 1,200° centigrade) for from five to eight hours, after which it is allowed to cool, either in the oven or after removal from the same. When the crucible has cooled, there is in it a mass of anhydrous oxide of barium extremely porous and of a grayish color, which may be completely detached from the carbonized skeleton left by the organic covering above referred to. There is thus removed by the crucible, first, a mass of oxide of barium excellently adapted for dioxidation, and, second, carbonized debris. The size of the crucibles may vary, and they may be of sufficient size for industrial operations. A modification of this method of operating consists in heating by itself in cast metal basins, either enameled or not, crystallized hydrated baryta, in such a manner as to drive off the greater part of its moisture, and then to mix it with finely-divided carbon, subsequently heating it in the crucible, as above described. This does not, however, in any way alter the characteristic reaction, and I prefer to first of all mix the carbon with the crystallized baryta, as above stated. If necessary, the operation of desiccation and of reduction could also be effected in the same apparatus, (muffle, retort, crucible, oven, or the like;) but it is preferable to operate separately in the manner already described. The anhydrous baryta thus obtained in the crucible is very porous and of great purity, and it only remains to crush it superficially in order to dioxidize it. In this crushed condition it is eminently adapted for dioxidation. This operation is effected in the manner usual in dioxide manufacture, which commences with oxide of barium obtained by the calcination of nitrate—that is to say, this superficially-crushed anhydrous baryta is introduced into iron tubes heated to a dull red and which are maintained at this temperature for some hours, air which has been freed as much as possible from its carbonic acid and its humidity being caused to pass over the mass. Oxygen may be substituted for air. When this operation is terminated, a whitish mass is withdrawn from the tubes. This is dioxide of barium at from eighty-six to ninety-four per cent. of purity and containing fewer impurities than dioxide of barium manufactured by the processes hitherto employed. It is not, in fact, contaminated by the substances composing the ovens or basins employed for the calcination of nitrate of baryta.

An important point in this process of manufacture is the care with which I insert within the crucible a lining of a substance capable of giving at a high temperature a carbon envelop which isolates the barytic mass from the material of the crucible. I do not indicate any special organic substance, those which may be employed being very numerous. However, I may cite as examples cardboard, paper, wood-pulp, and sheets of various vegetable fibers, and finally lining the crucible with carbon. By the use of this carbon envelop I obtain a mass of baryta which is not contaminated by the various substances entering into the composition of the crucibles. On the other hand, the block becomes more readily detached at the termination of the operation, and finally it forms an envelop which is almost tight and which facilitates the reaction.

The two principal advantages of my process are the following:

(a) More economical manufacture, because I avoid the losses occasioned by the employment of nitrous elements, while at the same time employing primary substances of low cost and which may be readily procured. I also obtain a high rate of yield in my various operations, thereby still further reducing the cost of production.

(b) I obtain a dioxide of barium which is rich and more pure than dioxide of barium manufactured by the processes hitherto employed.

What I claim is—

1. The herein-described process of manufacturing dioxide of barium from hydrated baryta which consists in mixing hydrated crystallized baryta with carbon in a finely-divided condition, next heating the mixture for the purpose of driving off the greater part of the water, next placing the magma in a crucible lined with a carboniferous substance, next subjecting said crucible to a high temperature for the purpose of effecting the complete transformation of the hydrated baryta into anhydrous and porous baryta by means of the reducing action of the finely-divided carbon, and finally dioxidizing the anhydrous baryta.

2. The herein-described process of manufacturing dioxide of barium from hydrated baryta, which consists in mixing hydrated crystallized baryta with carbon in a finely-divided condition in the proportion of one chemical equivalent of carbon to one of hydrated baryta, heating the mixture to a temperature of about 150° centigrade for the purpose of driving off the greater part of the water, placing the magma in a crucible lined with a carboniferous substance, subjecting said crucible and magma to a high temperature for the purpose of enabling the complete transformation of the hydrated baryta into anhydrous and porous baryta by means of the reducing action of the finely-divided carbon, and finally dioxidizing the anhydrous baryta in the usual manner.

3. The herein-described process of manufacturing dioxide of barium from hydrated crystallized baryta, which consists in first mixing therewith finely-divided carbon in substantially the proportions stated, next placing said mixture in a metallic basin, heating said mixture and basin for two or three hours at a temperature of 100° to 150° centigrade, next placing the magma thus obtained in a crucible lined with carbonaceous material, heating said crucible and magma to a temperature of 1,000° to 1,200° centigrade for a period of five to eight hours and finally producing dioxide of barium from the anhydrous oxide of barium in the usual manner.

In testimony whereof I have hereunto set my hand, in presence of two subscribing witnesses, this 28th day of November, 1898.

CLAUDE SAVIGNY.

Witnesses:
CLÉMENT MARTIN,
JEAN GERMAIN.